Charles R. Glanville
INVENTOR.

BY *Gary C. Honeycutt*
ATTORNEY

United States Patent Office 3,302,101
Patented Jan. 31, 1967

3,302,101
ELECTRODE SYSTEM HAVING A POTENTIAL ELECTRODE EMBEDDED WITHIN A CURRENT ELECTRODE FOR MEASURING THE ELECTRICAL RESISTIVITY OF A POROUS ROCK SAMPLE
Charles R. Glanville, Tulsa, Okla., assignor, by mesne assignments, to Esso Production Research Company, Houston, Tex., a corporation of Delaware
Filed Mar. 26, 1964, Ser. No. 354,876
6 Claims. (Cl. 324—13)

This invention relates to the analytical determination of the electrical resistivities of materials. More particularly, apparatus is provided for measuring the electrical resistivity of a porous rock sample containing electrically conductive fluids. Specifically, an improved four-electrode system is provided wherein a current and potential electrode pair are positioned in a single plane at each end of the sample.

The electrical resistivity of subterranean reservoir rock has long been recognized as a reliable indicator of many important properties of the rock and of the fluids which it contains. Among the most important factors known to affect the reservoir rock resistivity are the temperature, porosity, permeability, salinity of contained water, degree of water saturation and abundance of clay minerals or "conductive solids."

Various techniques are widely practiced for the electrical logging of boreholes in the earth, many of which involve the in-situ measurement of electrical resistivity of porous subterranean formations. In the interpretation of such logs, the effect of overburden and fluid pressure on the resistivity of reservoir rock has been generally ignored. It has recently been demonstrated, however, that reservoir stress increases resistivity in varying amounts depending upon depth of formation, porosity, texture of rock and degree of water saturation. For the purpose of providing a quantitative interpretation of electrical resistivity logs a laboratory technique for resistivity analysis of core plug samples under pressure was developed several years ago. See for example The Journal of Petroleum Technology, vol. XI, No. 4, pages 20–26 (April 1959).

For core analysis in high-pressure cells, such prior systems have now been found unsatisfactory, due in part to mechanical and hydraulic problems of incorporating the potential electrodes. Moreover, the data obtained has been found to be unreliable because of dependence upon sample orientation, and because a relatively large portion of the sample is not analyzed.

Accordingly, it is an object of the present invention to provide a symmetrical electrode system for obtaining electrical resistivity measurements which are independent of sample orientation. It is also an object of the invention to provide an apparatus for obtaining electrical resistivity measurements which are more representative of the total sample than the measurements obtained with previously available equipment.

It is a further object of the invention to provide a four-electrode system which is readily adapted for incorporation into laboratory apparatus for pressurizing core samples to simulate overburden pressures during the process of measuring the electrical resistivity of core samples. It is also an object of the invention to provide a four-electrode system in which the measurement of potential difference is a linear function of spacing between the potential electrodes, in order to avoid the need for special calibration.

The complete system includes a pressure cell for simulating reservoir conditions, a four-electrode system for establishing electrical contact with the sample, a source of electric power, and a resistivity meter for measuring difference in potential. The pressure cell contains a fluid bath, usually a light oil, and is equipped with a pump and pressure gauge for supplying simulated overburden pressure to the sample, which is suspended in the fluid bath.

The core sample is mounted between two end-butt electrode pairs, and the combination is encased within a mounting material which is able to withstand and transmit the pressure exerted by the fluid bath in the pressure cell. Thus a thermosetting resin coat may be molded directly to the core sample and electrodes. A rubber sleeve mounting may also be used.

A conduit for supplying internal fluid pressure to the core sample terminates at the face of each electrode pair and extends through the wall of the pressure cell. These conduits are preferably electrically insulated from the pressure cell, in order that they may serve as electrical leads to the current carrying electrodes.

Each end-butt electrode pair includes a current electrode and a potential electrode. The electrode pair which abuts the core sample at each end is predominantly current-carrying electrode, the contact surface of which carries the relatively smaller potential electrode embedded therein. The potential electrode is bonded into one or more grooves, channels, or other recessed areas in the surface of the current electrode, and is electrically insulated therefrom. The contact surfaces of the current and potential electrodes generally must lie in a single plane, in order to establish suitable contact with the core sample, since the ends of the sample are normally flat. In a preferred embodiment, each potential electrode is radially symmetrical with respect to a line normal to the corresponding current electrode at its center.

Figure 1:
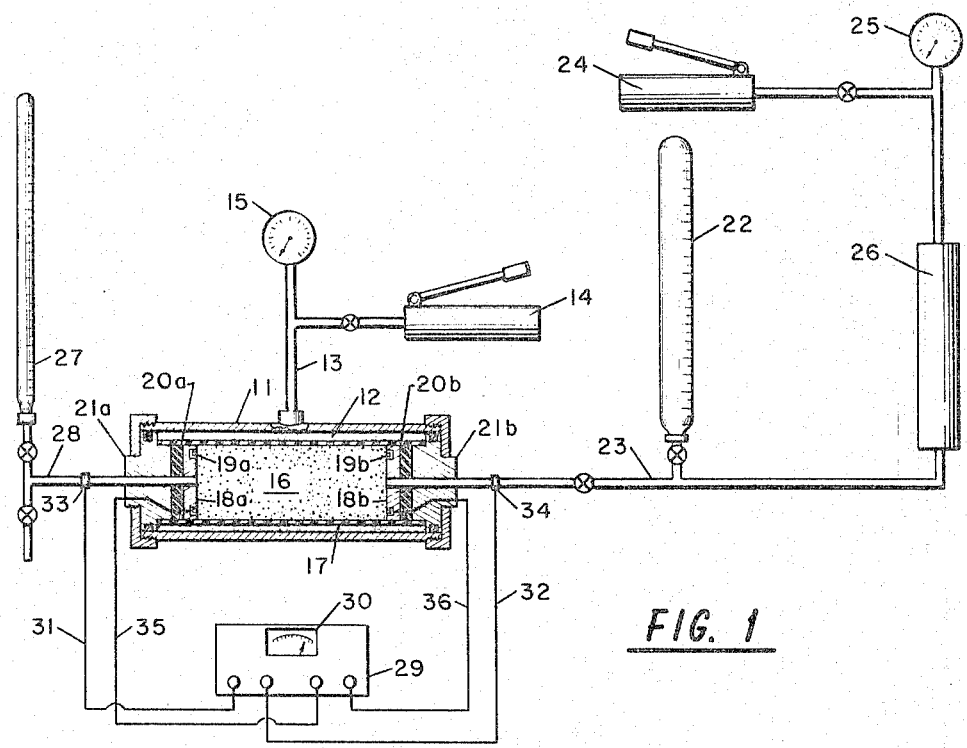
FIGURE 1 is a schematic diagram of the complete system for obtaining resistivity measurements at simulated reservoir conditions.

Referring to FIGURE 1 in detail, the system includes pressure cell 11 supplied with oil bath 12 by means of conduit 13 and hydraulic pump 14. Simulated overburden pressures are measured by gauge 15. Core sample 16 is mounted within rubber sleeve 17, and between current carrying electrodes 18a and 18b, in which potential electrodes 19a and 19b are embedded, respectively.

In order that tri-axial compression of the core sample may be assured, soft rubber washers 20a and 20b are preferably provided between the end-butt electrode pairs and insulator plugs 21a and 21b.

Reservoir 22 supplies brine for saturation of the core sample through conduit 23, which extends to the face of core 16 at the center of current electrode 18b. Internal pressure within the core sample is supplied by means of pump 24 and is measured by means of gauge 25. Preferably the pump and gauge are oil-filled, thus requiring the use of oil-water exchange cell 26.

Graduated reservoir 27 is provided for measuring the volume of fluids ejected from the core sample by overburden pressure, in determining sample compressibility.

Resistance meter 29 matches a known variable potential from a standard resistor with the unknown potential across sample 16, as measured between potential electrodes 19a and 19b, which are connected to meter 29 through electrical leads 35 and 36. Power supplied to the sample is preferably a 60-cycle alternating current. The power is supplied to electrodes 18a and 18b through electrical leads 31 and 32, which for convenience are preferably connected to conduits 23 and 28 at points 33 and 34, respectively. Resistance readings, usually in the range of 0 to 100,000 ohms, are taken directly from scale 30. If desired, the scale may be calibrated to provide readings of potential difference.

Once the measurement of resistance (or difference in potential) is obtained, resistivity is readily calculated, for a sample of uniform cross-section, from the following relationship:

$$\rho = \frac{(E/I) \times A}{L}$$

where
$\rho$ = sample resistivity
$E$ = potential drop across sample
$I$ = current flow through sample
$L$ = length of sample, and
$A$ = cross-sectional area of sample.

It is an especially desirable feature of the present electrode system that the above-linear relationship is valid, thus eliminating the need for special calibration of the system.

Figure 2:
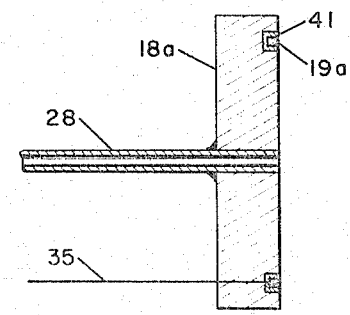
FIGURE 2 is a cross-section of an end-butt electrode pair, taken along line 2—2 of FIGURE 3.

In FIGURE 2 the details of electrodes 18a and 19a are shown. Electrodes 18b and 19b, not shown in detail, are preferably identical to 18a and 19a. In the embodiment shown, the current and potential electrodes are stainless steel. Other electrically conducting metals or alloys, for example Monel alloy, are also suitable. Potential electrode 19a is embedded within a circular groove provided on the contact face of electrode 18a. Bonding material 41 also serves as electrical insulation between the current and potential electrodes. In the embodiment shown, the bonding and insulation are provided by a thin film of epoxy resin.

Generally, the thickness of the insulating film at the contact surface must fall within a range of 0.001 to 0.007 inch, and preferably within the range of 0.003 to 0.004 inch. However, if the current electrodes are to have a diameter of more than about 2 inches, a somewhat greater insulation thickness may be tolerated, but not greater than about 0.35% of the current electrode diameter. It has been established that a thicker insulation film causes electrical distortions in the samples, thereby rendering the resistivities inaccurate when calculated by the above equation. On the other hand, a thinner bond separating the two electrodes usually gives an unacceptably low electrical insulation.

Figure 3:
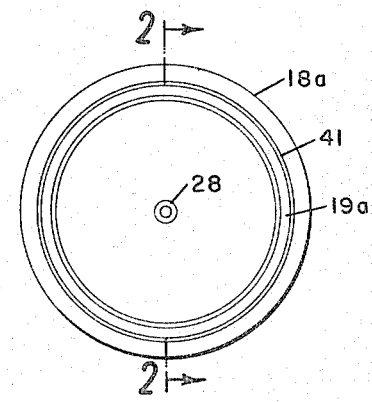
FIGURE 3 shows the contact face of an electrode pair.

FIGURE 3 shows the contact face of electrode pair 18a and 19a. The embodiment shown is specifically adapted for use in connection with the analysis of porous rock samples having a cylindrical shape of circular cross-section, such as are conventionally cut from cores obtained in the rotary drilling of boreholes in the earth. Samples of solids of other shapes may also be analyzed. The system is also suitable for the analysis of fluid samples, for example in the determination of the conductivity of brines. Preferably, the contact face of each electrode pair should conform in shape to the cross-section of the core sample being analyzed. The radial symmetry of electrode 19a is especially desirable, since it permits resistivity readings to be obtained which are independent of the sample orientation.

In a specific embodiment, electrodes 18a and 18b have a diameter of 1.5 inches, and the width of the contact surface of electrodes 19a and 19b is about 0.06 inch. Generally, the ratio of the potential electrode width to the current electrode diameter must fall within the range of about 0.01 to 0.10, and preferably from 0.02 to 0.06.

In a preferred embodiment, represented by FIGURE 3, potential electrode 19a completes an arc of 360°. It is within the scope of the invention, however, to provide a divided potential electrode whereby two or more electrode segments are substantially evenly distributed about the center of the current electrode. The sum of the arcs completed by the segments should be at least about 45°, in order to avoid a substantial dependence upon sample orientation.

What is claimed is:

1. Apparatus for measuring the electrical resistivity of a porous rock sample at simulated subsurface pressures comprising a pressure cell, means for supplying simulated reservoir pressures to the interior of said pressure cell, means for mounting said sample within the cell, a first electrode pair positioned within said cell for establishing contact with one end of said sample, a second electrode pair within said cell positioned to contact the other end of said sample, each of said electrode pairs comprising a current electrode and a potential electrode, each of said current electrodes having a substantially flat contact face, except for a recessed area therein to accommodate each of said potential electrodes, respectively; said potential electrodes being bonded in said recessed area and electrically insulated from said current electrodes; means for connecting an electric power source across said current electrodes, and means for indicating the difference in potential between said two potential electrodes.

2. A system as defined by claim 1, wherein said potential electrodes are radially symmetrical, respectively, with respect to a line normal to each current electrode at its center.

3. A system as defined by claim 2, wherein the ratio of the width of each potential electrode at its contact surface to the diameter of the current electrode is 0.01 to 0.10, and the thickness of the insulating layer is 0.001 to 0.007 inch.

4. Apparatus for measuring the electrical resistivity of a porous rock sample at simulated subsurface pressures comprising a pressure cell, means for supplying simulated reservoir pressures to the interior of said pressure cell, means for mounting said sample within said cell, means for supplying said sample with an internal fluid pressure independently of said simulated reservoir pressure, and an electrode system for obtaining resistivity measurements mounted within said pressure cell, said electrode system comprising two current electrodes and two potential electrodes, one of said current electrodes being positioned to engage one end of said sample, and the other current electrode being positioned to engage the other end of said sample, means for connecting an electric power source across the current electrodes, and means for indicating the difference in potential between said two potential electrodes; each of said current electrodes having a substantially flat contact face, except for a groove therein to accommodate each of said potential electrodes, respectively; said potential electrodes being bonded in said grooves and electrically insulated from said current electrodes.

5. Apparatus as defined by claim 4 wherein said potential electrodes are radially symmetrical, respectively, with respect to a line normal to each current electrode at its center.

6. Apparatus as defined by claim 4 wherein the ratio of the width of each potential electrode at its contact surface to the diameter of the current electrode is 0.01 to 0.10, and the thickness of the insulating layer is 0.001 to 0.007 inch.

References Cited by the Examiner
UNITED STATES PATENTS

| | | | |
|---|---|---|---|
| 2,172,778 | 9/1939 | Taylor | 324—9 X |
| 2,583,276 | 1/1952 | Patnode | 324—13 X |
| 2,583,284 | 1/1952 | Willie et al. | 324—13 X |
| 2,613,250 | 10/1952 | Bilhartz et al. | 324—13 X |
| 2,745,057 | 5/1956 | Dotson | 324—13 |
| 2,802,172 | 8/1957 | Mueller et al. | 324—13 |
| 2,802,173 | 8/1957 | Nisle | 324—13 |
| 2,839,721 | 6/1958 | DeWitte | 324—10 X |
| 2,872,638 | 2/1959 | Jones | 324—1 |
| 3,028,542 | 4/1962 | Terry | 324—1 X |
| 3,060,373 | 10/1962 | Doll | 324—10 X |
| 3,115,602 | 12/1963 | Sutton et al. | 324—10 |
| 3,132,298 | 5/1964 | Doll et al. | 324—10 |

WALTER L. CARLSON, *Primary Examiner.*

G. R. STRECKER, *Assistant Examiner.*